(12) United States Patent
Janczak et al.

(10) Patent No.: US 9,449,360 B2
(45) Date of Patent: Sep. 20, 2016

(54) REDUCING THE NUMBER OF SEQUENTIAL OPERATIONS IN AN APPLICATION TO BE PERFORMED ON A SHARED MEMORY CELL

(75) Inventors: Tomasz Janczak, Gdansk (PL); Marek Targowski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 13/997,056

(22) PCT Filed: Dec. 28, 2011

(86) PCT No.: PCT/US2011/067467
§ 371 (c)(1),
(2), (4) Date: Mar. 31, 2014

(87) PCT Pub. No.: WO2013/100928
PCT Pub. Date: Jul. 4, 2013

(65) Prior Publication Data
US 2014/0198110 A1    Jul. 17, 2014

(51) Int. Cl.
*G06F 15/167* (2006.01)
*G06T 1/60* (2006.01)
*G06T 1/20* (2006.01)
*G06F 9/455* (2006.01)
*G06F 9/52* (2006.01)
*G06F 13/16* (2006.01)

(52) U.S. Cl.
CPC ............. *G06T 1/20* (2013.01); *G06F 9/4552* (2013.01); *G06F 9/526* (2013.01); *G06F 13/1605* (2013.01); *G06T 1/60* (2013.01)

(58) Field of Classification Search
None
See application file for complete search history.

(56) References Cited

U.S. PATENT DOCUMENTS

| 7,492,368 B1* | 2/2009 | Nordquist ............ G06F 13/161 345/502 |
| 7,681,019 B1 | 3/2010 | Favor |
| 7,725,518 B1 | 5/2010 | Le Grand |
| 7,921,220 B2 | 4/2011 | Barsness et al. |

(Continued)

FOREIGN PATENT DOCUMENTS

| EP | 0244540 A2 * | 11/1987 | ........ G06F 13/1631 |
| WO | 2013/100928 A1 | 7/2013 | |

OTHER PUBLICATIONS

International Search Report and Written Opinion received for PCT application No. PCT/US2011/067467, mailed on Jun. 25, 2012, 10 pages.

(Continued)

*Primary Examiner* — Jacinta M Crawford
(74) *Attorney, Agent, or Firm* — Jordan IP Law, LLC (57) ABSTRACT

Methods and apparatuses to reduce the number of sequential operations such as atomic operations in an application to be performed on a shared memory cell may be provided. A translation unit can detect in the application multiple atomic operations to be performed on the same memory and replaces the multiple atomic operations with an equivalent single atomic operation. In some implementations, the application includes shader code. In some implementations, each of the multiple atomic operations increment a value stored at the same memory by an update amount. The translation unit may calculate the partial prefix sum over all the atomic operations and replace the multiple atomic operations with a single atomic operation to increment the value stored at memory by the sum of the update amounts.

20 Claims, 6 Drawing Sheets

(56) References Cited

U.S. PATENT DOCUMENTS

| | | | |
|---|---|---|---|
| 8,006,236 B1* | 8/2011 | Kilgard et al. | 717/136 |
| 8,364,739 B2* | 1/2013 | Baskaran | G06F 17/16 706/12 |
| 9,058,792 B1* | 6/2015 | Edmondson et al. | 345/547 |
| 2005/0204119 A1 | 9/2005 | Saha | |
| 2007/0294680 A1 | 12/2007 | Papkipos et al. | |
| 2009/0070568 A1 | 3/2009 | Shi et al. | |
| 2009/0240895 A1* | 9/2009 | Nyland | G06F 9/3824 711/149 |
| 2010/0277486 A1 | 11/2010 | Bhoovaraghavan | |
| 2012/0284701 A1* | 11/2012 | Tsai et al. | 717/151 |
| 2013/0132684 A1* | 5/2013 | Ostrovsky et al. | 711/147 |

OTHER PUBLICATIONS

International Preliminary Report on Patentability and Written Opinion received for PCT Patent Application No. PCT/US2011/067467, mailed on Jul. 10, 2014, 7 pages.

European Search Report for EP Patent Application No. 11878802.5, dated Aug. 13, 2015, 7 pages.

* cited by examiner

FIG. 1

```
CurrentInstruction = GetFirstInstruction( simdProgram );
while( CurrentInstruction != NULL ) {
        if( ( IsAtomicVectorInstruction( CurrentInstruction ) == true ) &&
        ( AreAllAddressesTheSame( CurrentInstruction ) == true ) )
{
                Sum = CalculatePartialPrefixSumOfData( CurrentInstruction );
                NewInstruction = new ScalarInstruction();
                NewInstruction->ScalarData = Sum;
                ReplaceInstruction(
                        simdProgram,
                        CurrentInstruction,
                        NewInstruction );
                delete CurrentInstruction;
                CurrentInstruction = GetNextInstruction( NewInstruction );
        }
        else {
                CurrentInstruction = GetNextInstruction( CurrentInstruction );
        }
}
```

REDUCING THE NUMBER OF SEQUENTIAL OPERATIONS IN AN APPLICATION TO BE PERFORMED ON A SHARED MEMORY CELL

BACKGROUND

This disclosure relates to reducing the number of sequential operations such as atomic operations to be performed on a shared memory cell.

Parallel processing can be implemented in a computer system to achieve faster execution of applications over traditional sequential processing. For example, a single instruction multiple data (SIMD) instruction is an example parallel process where a single instruction is performed simultaneously on multiple data. Such SIMD instructions can help speed up data processing in applications including multimedia, video, audio encoding/decoding, 3-Dimensional (3-D) graphics and image processing.

However, in a computer system that supports parallel processing, certain program operations that access a same memory cell in the computing system may need to be synchronized to ensure against unintended results such as data corruption if the program operations access the same memory cell in parallel. For example, program operations may need to be synchronized because the result to be stored in a memory cell of one program operation may be needed to perform another program operation.

Synchronization of program operations that access the same memory cell can be achieved by placing these program operations in a critical section. In a critical section, operations are performed sequentially, for example using atomic operations, instead of concurrently in parallel to ensure that the shared memory cell is accessed serially by the program operations thereby avoiding data corruption or other unintended results.

Generally, an atomic operation may be one or more computer operation(s) (e.g., read, modify, and then write to a memory cell) that a computing system forces to be completed (e.g., using a lock variable) prior to execution of a subsequent computer operation. Thus, by placing program operations that access a same memory cell in a critical section, the shared memory cell is accessed serially by the program operations thereby avoiding data corruption or other unintended requests.

The synchronization of program operations that access the same memory cell, however, may reduce the efficiency of parallel processing architectures.

DETAILED DESCRIPTION

Various implementations of this disclosure provide apparatuses and methods for reducing the number of sequential operations such as atomic operations in an application to be performed on a shared memory cell.

Figure 1:
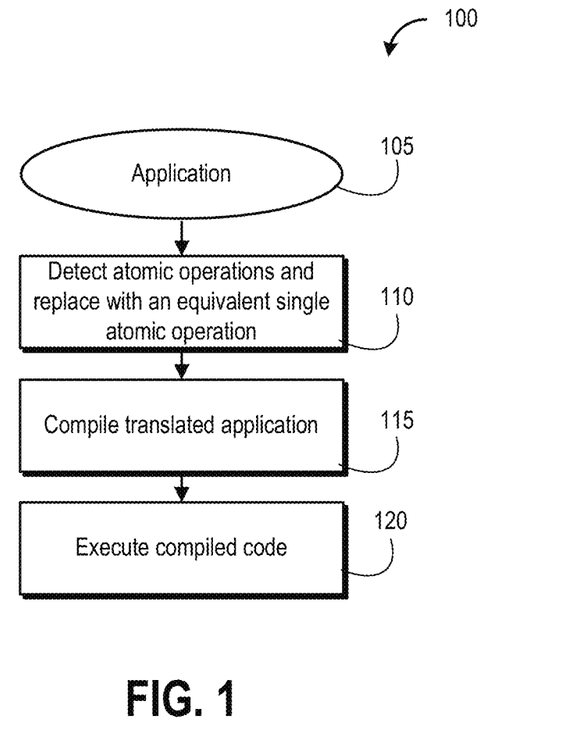
FIG. 1 is a block diagram illustrating an example process of reducing the number of sequential operations such as atomic operations in an application to be performed on a shared memory cell.

FIG. 1 illustrates an example process 100 of reducing the number of sequential operations such as atomic operations in an application to be performed on a shared memory cell.

The process 100 may be implemented as a set of executable logic instructions stored in a machine- or computer-readable storage medium such as random access memory (RAM), read only memory (ROM), programmable ROM (PROM), flash memory, firmware, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the process 100 may be written in any combination of one or more programming languages, including an object oriented programming language such as C++ or the like and conventional procedural programming languages, such as the "C" programming language or similar programming languages or programming languages for graphics such as the High Level Shader Language (HLSL) (by Microsoft DirectX), the OpenGL Shading Language (GLSL) (by OpenGL), or the Open Computing Language (OpenCL). Moreover, in some implementations, various aspects of the process 100 could be implemented as embedded logic of a graphic driver using any of the aforementioned circuit technologies.

At stage 105, an application is input into a translation unit. In some implementations, the application includes shader code which may be input into a driver such as a graphics driver or OpenCL run-time driver, for example, that includes a translation unit. In some implementations, the application is loaded by an operating system storing the application in the memory of a computing device. Computing devices contemplated to be within the scope of this disclosure include personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. In some implementations, the computing device will include a main memory coupled to a processor, an operating system to be executed by the processor, and a graphics circuit/processor (such as a graphics processing unit (GPU)) to store instructions of compiled shader code in registers to display objects of an application on a monitor or screen.

In some implementations, computing devices contemplated to be within the scope of this disclosure include general-purpose computing on graphics processing units (GPGPU).

At stage 110, the translation unit detects in the application multiple atomic operations to be performed on the same memory and replaces the multiple atomic operations with an equivalent single atomic operation. For example, in some implementations, the application input to the translation unit at stage 105 can include N atomic operations to increment a value stored at an address (e.g., "add $a_1$ atomically at address X", "add $a_2$. atomically at address X", . . . , "add $a_N$ atomically at address X"). Each atomic operation may include a memory read-write operation. The translation unit at stage 110 can detect these atomic operations to be performed on the same memory at address X, calculate the partial prefix sum over all the atomic operations, and replace the N atomic operations with a single atomic operation to increment the value stored at address X by the sum of the N increments. In some implementations, N equals a SIMD execution engine width. Thus, since N operations execute in lock-step on SIMDn machines, a local partial prefix sum of N data elements can be computed. Thus, a localized partial prefix sum can be calculated up to a SIMD execution engine length (e.g. a 16-element partial sum in a SIMD16 execution engine). Thus, a localized partial prefix sum is calculated over data which is executed by one SIMD execution engine.

Figure 2:
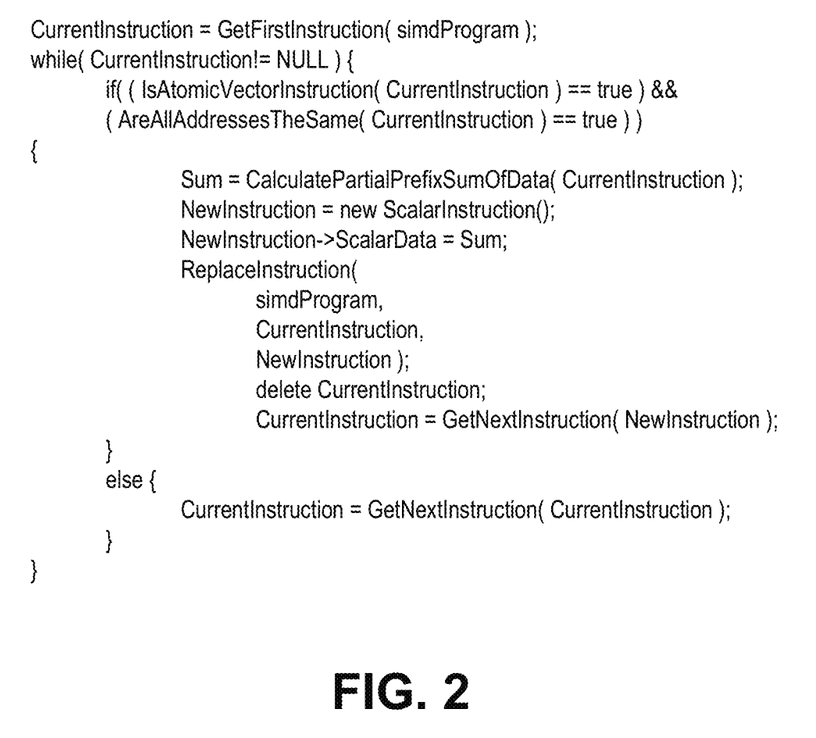
FIG. 2 illustrates an example code to detect in an application multiple atomic operations to be performed on the same memory and replace the multiple atomic operations with an equivalent single atomic operation.

FIG. 2 illustrates an example code to detect in the application multiple atomic operations to be performed on the same memory and replaces the multiple atomic operations with an equivalent single atomic operation.

At stage 115, the translated operations at stage 110 are compiled. In some implementations, when the translated application includes shader code, the translated operations can be compiled by a just-in-time (JIT) compiler into graphics hardware machine language to be executed by a graphics circuit such as a GPU. In some implementations, the translation unit and the compiler are integral inside a driver. In some implementations, a GPU includes the translation unit and compiler.

At stage 120, the compiled code is executed, for example, in a parallel processing environment. In some implementations, the compiled code is executed by a GPU.

Figure 3:
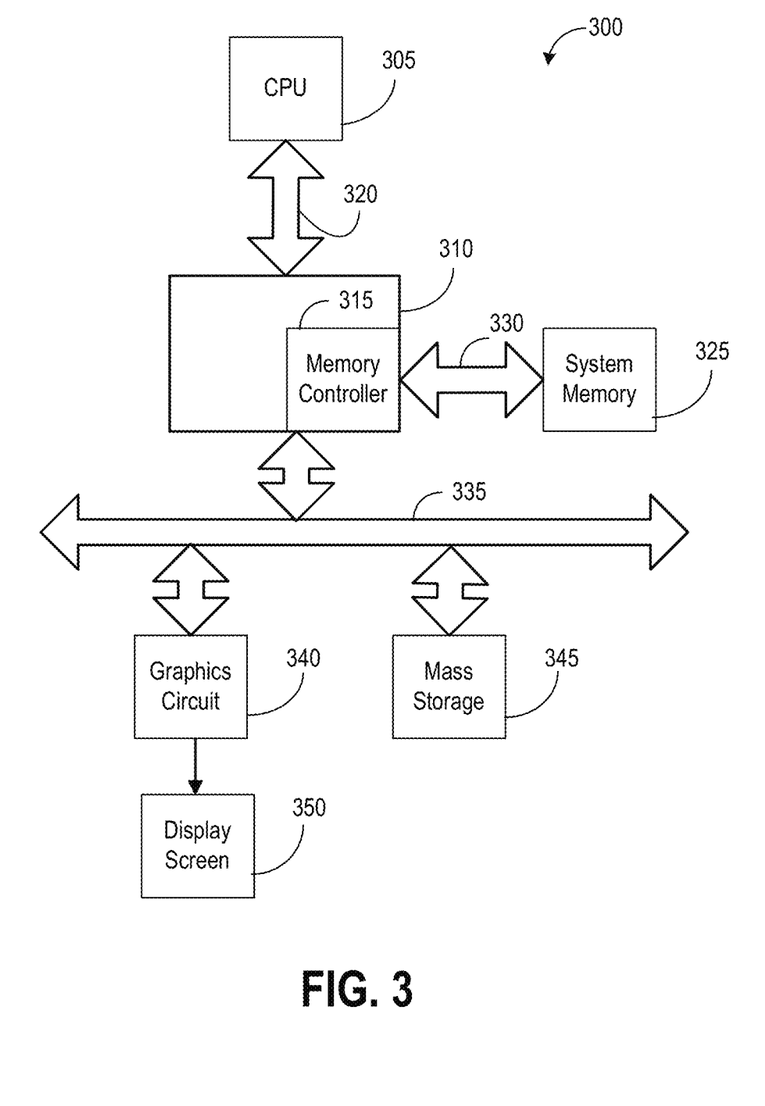
FIG. 3 is a block diagram illustrating an example system operable to perform the example process 100 of FIG. 1.

FIG. 3 illustrates an example system 300 operable to perform the example process 100 of FIG. 1. The system 300 can include a processor or a central processing unit (CPU) 305. In some implementations, the system 300 can include multiple processors. The CPU 305 can be coupled to a bus controller 310 via a CPU bus 320.

The bus controller 310 can include a memory controller 315. In some implementations, the memory controller 315 can be external to the bus controller 310. The memory controller 315 interfaces devices to a system memory 325 via a memory bus 330. In some implementations, the system memory 325 can be described as a "main memory" of the system 300.

In some implementations, the system memory 325 can store an application program (e.g., an application input to translation unit at stage 105 of FIG. 1) to be executed by a processor (e.g., the CPU 305 or graphics circuit 340). In some implementations, the program, which can be expressed in a high-level language, can be subject to translation and computation as described above by a driver such as a graphics driver or OpenCL run-time driver, for example. In some implementations, the system memory 325 can store instructions that when executed by a processor (e.g., the CPU 305) causes the system 300 to execute the process 100 of FIG. 1.

The bus controller 310 can be coupled to a system bus 335 along with various devices such as a graphics circuit 340 (such as a GPU) and a mass storage device 345.

The graphics circuit 340 can be coupled to a screen 350, such as a computer screen or monitor for displaying graphics, graphics objects, images, frames, video, etc. In some implementations, the graphics circuit 340 includes GPGPU. In some implementations, the graphics circuit 340 includes a memory controller. In some implementations the graphics circuit 340 implements various aspects of the process 100.

In some implementations, the mass storage device 345 can store an operating system (e.g., an application input to translation unit at stage 105 of FIG. 1) to be loaded into the system memory 325 and executed by a processor (e.g., the CPU 305). The mass storage device 345 can include, for example, a hard disk, floppy disk, compact disk read only memory (CD-ROM), digital video disk read only memory (DVD-ROM), tape, high density floppy, high capacity removable media, low capacity removable media, solid state memory device, and combinations thereof.

The system 300 may include a graphics driver (e.g., such as part of an operating system (OS)) and at least one application program, which in some implementations, are loaded into the system memory 325 from the mass storage device 345 and launched after power on self test (POST).

Figure 4:
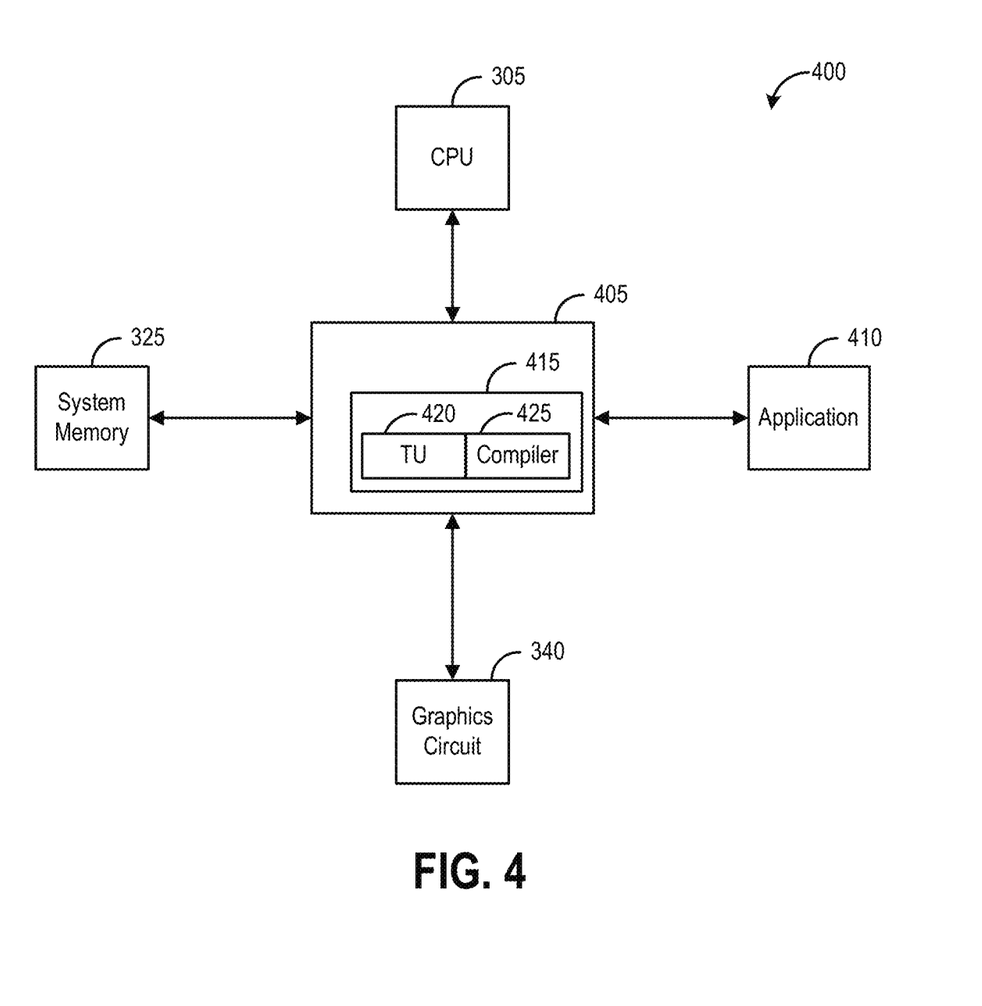
FIG. 4 is a block diagram illustrating an example compiler system operable to perform the example process of FIG. 1 when an application includes shader code.

FIG. 4 illustrates an example compiler system 400 operable to perform the example process 100 of FIG. 1 when an application includes shader code.

The compiler system 400 can include an operating system 405, which is linked to an application 410 (such as an application at stage 105 of FIG. 1), the graphics circuit 340 of FIG. 3, the system memory 325 of FIG. 3, and the CPU 305 of FIG. 3.

The operating system 405 can include a graphics driver 415 having a translation unit ("TU") 420 and a compiler 425. In some implementations, the translation unit ("TU") 420 and a compiler 425 are integral.

The operating system 405 can include or access a machine accessible medium (e.g., such as the mass storage 345 of FIG. 3) containing a sequence of instructions that when executed by a processor (such as the CPU 305) cause the application 410 to be input to the translation unit 420 (e.g., as described with respect to stage 105 of FIG. 1), cause the translation unit 420 to detect in the application 410 multiple atomic operations to be performed on the same memory and replace the multiple atomic operations with an equivalent single atomic operation (e.g., as described at stage 110 of FIG. 1), cause the compiler 425 to compile the translated application into compile code (e.g., as described at stage 115 of FIG. 1), and cause the graphics circuit 340 to execute the compiled code (e.g., as described at stage 120 of FIG. 1).

Figure 5:
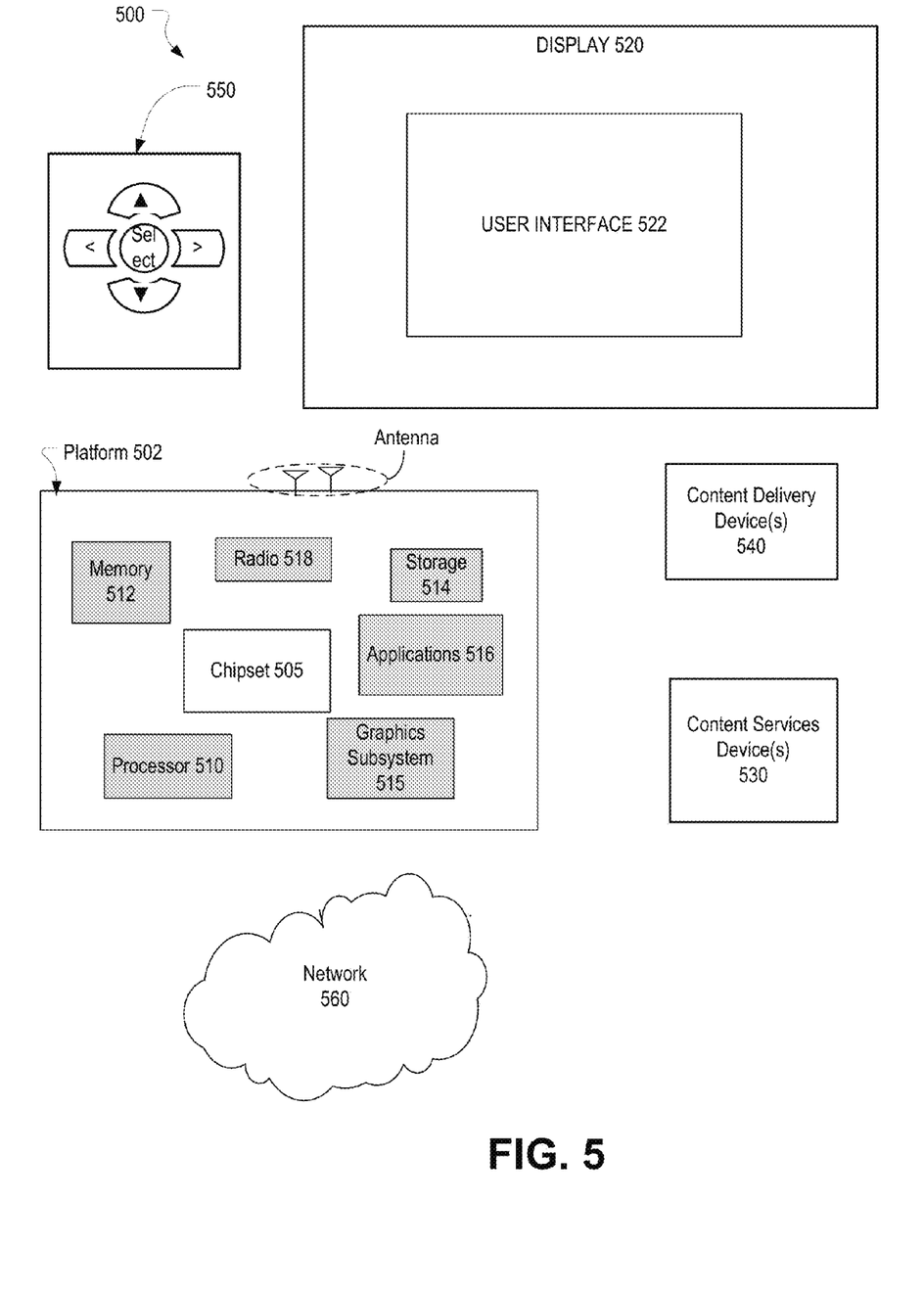
FIG. 5 is a block diagram illustrating an example system of this disclosure.

FIG. 5 illustrates an example embodiment of a system 500 of this disclosure comprising a platform 502, a display 520, content services device(s) 530, content delivery device(s) 540, and navigation controller 550. In embodiments, system 500 may be a media system although system 500 is not limited to this context. For example, components of system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still images or video for display. Graphics subsystem 515 may be a graphics processing unit (GPU) or a visual processing unit (VPU), for example or may include integrated processor graphics technology. An analog or digital interface may be used to communicatively couple graphics subsystem 515 and display 520. For example, the interface may be any of a High-Definition Multimedia Interface, DisplayPort, wireless HDMI, and/or wireless HD compliant techniques. In embodiments, graphics subsystem 515 could be integrated into processor 510 or chipset 505. In embodiments, graphics subsystem 515 could be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520 directly or via network 560. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 receives content such as cable television programming including media information, digital information, and/or other content. Examples of content providers may include any cable or satellite television or radio or Internet content providers. The provided examples are not meant to limit embodiments of the invention.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chip set 505 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the invention.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
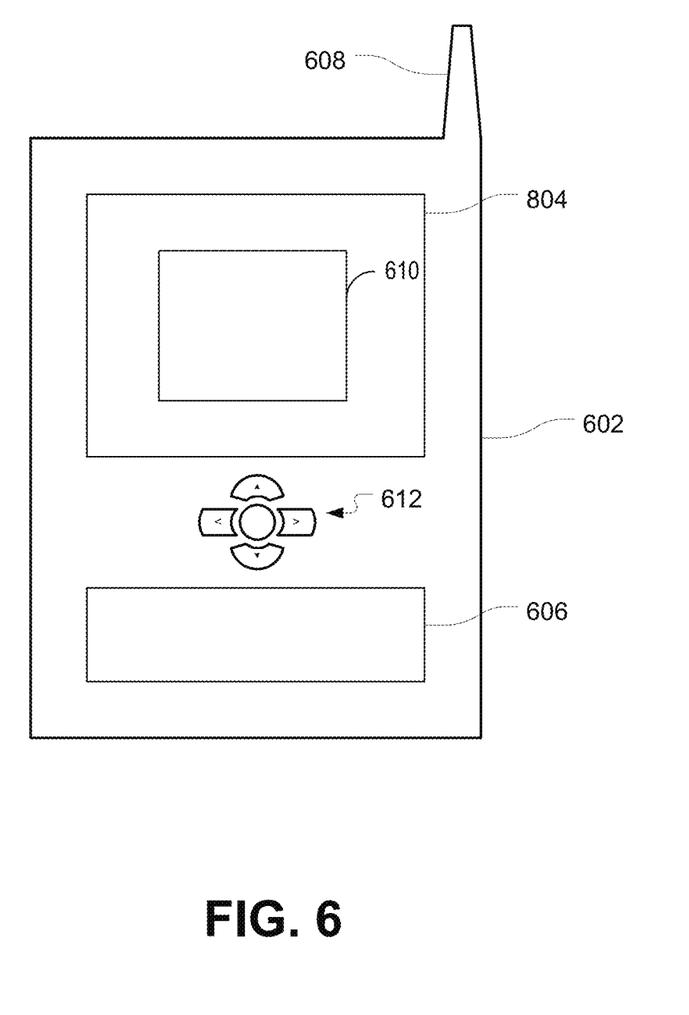
FIG. 6 is a block diagram illustrating an example small form factor device in which components of the system of FIG. 5 may be embodied.

As described above, system 500 may be embodied in varying physical styles or form factors. FIG. 6 illustrates embodiments of a small form factor device 600 in which components of system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments may therefore include a computer implemented method in which a plurality of atomic operations to be performed on a memory are detected in an application. The computer implemented method may also provide for replacing the plurality of atomic operations in the application with an equivalent single atomic operation to produce a translated application. Still further, the computer implemented method may provide for compiling the translated application.

Embodiments may include a system including a storage device to store an application and a central processor to load the application from the storage device to a translation unit. The system may further include a graphics driver including the translation unit and a compiler, the translation unit to detect in the application a plurality of atomic operations to be performed on a memory and replace the plurality of atomic operations in the application with an equivalent single atomic operation to produce a translated application, and the compiler to compile the translated application. The system may further include a graphics processor to execute the translated application.

Embodiments may include a computer readable medium comprising a set of instructions which, if executed by a processor, cause a computer to detect in an application a plurality of atomic operations to be performed on a memory, replace the plurality of atomic operations in the application with an equivalent single atomic operation to produce a translated application, and compile the translated application.

Embodiments may include a system including a storage device to store an application, a translation unit configured to detect in the application a plurality of atomic operations to be performed on a memory and replace the plurality of atomic operations in the application with an equivalent single atomic operation to produce a translated application, and a compiler to compile the translated application.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines.

Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. A system comprising:
a storage device to store an application;
a central processor to load the application from the storage device to a translation unit;
a graphics driver including:
the translation unit to detect in the application a plurality of atomic operations that are to include all atomic operations in the application to be performed sequentially on a same address in memory, wherein each of the plurality of atomic operations is to increment a value stored in the memory by an update amount, and to replace the plurality of atomic operations in the application with an equivalent single atomic operation to produce a translated application by computation of a localized partial prefix sum of the update amounts and replacement of the plurality of atomic operations in the application with an atomic operation to increment the value stored in the memory by an amount equal to a sum of the update amounts; and
a compiler to compile the translated application; and a graphics processor to execute the translated application.

2. The system of claim 1, wherein the application includes shader code.

3. The system of claim 1, wherein the localized partial prefix sum of the update amounts is to be up to a SIMD execution engine length.

4. The system of claim 1, wherein the compiler includes a just-in-time compiler.

5. The system of claim 1, wherein the graphics processor includes a SIMD architecture.

6. A computer implemented method comprising:
detecting in an application a plurality of atomic operations including all atomic operations in the application to be performed sequentially on a same address in memory, wherein each of the plurality of atomic operations increments a value stored in the memory by an update amount;
replacing the plurality of atomic operations in the application with an equivalent single atomic operation to produce a translated application by computing a localized partial prefix sum of the update amounts and replacing the plurality of atomic operations in the application with an atomic operation to increment the value stored in the memory by an amount equal to a sum of the update amounts; and
compiling the translated application.

7. The computer implemented method of claim 6, wherein the application includes shader code.

8. The computer implemented method of claim 6, wherein the localized partial prefix sum of the update amounts is up to a SIMD execution engine length.

9. The computer implemented method of claim 6, further including executing the translated application.

10. A non-transitory computer readable medium comprising a set of instructions which, if executed by a processor, cause a computer to:
detect in an application a plurality of atomic operations that are to include all atomic operations in the application to be performed sequentially on a same address in memory, wherein each of the plurality of atomic operations is to increment a value stored in the memory by an update amount;
replace the plurality of atomic operations in the application with an equivalent single atomic operation to produce a translated application by computation of a localized partial prefix sum of the update amounts and replacement of the plurality of atomic operations in the application with an atomic operation to increment the value stored in the memory by an amount equal to a sum of the update amounts; and
compile the translated application.

11. The computer readable medium of claim 10, wherein the application includes shader code.

12. The computer readable medium of claim 10, wherein the localized partial prefix sum of the update amounts is to be up to a SIMD execution engine length.

13. The computer readable medium of claim 10, wherein the instructions, if executed, cause a computer to compute partial prefix sums of a plurality of update amounts outside a critical section.

14. The computer readable medium of claim 10, wherein the instructions, if executed, cause a computer to execute the translated application.

15. A system comprising:
a storage device to store an application;
a translation unit to:
detect in the application a plurality of atomic operations that are to include all atomic operations in the application to be performed sequentially on a same address in memory, wherein each of the plurality of atomic operations is to increment a value stored in the memory by an update amount; and
replace the plurality of atomic operations in the application with an equivalent single atomic operation to produce a translated application by computation of a localized partial refix sum of the u s date amounts and re s lacement of the plurality of atomic operations in the application with an atomic operation to increment the value stored in the memory by an amount equal to a sum of the update amounts; and
a compiler to compile the translated application.

16. The system of claim 15, wherein the application includes shader code.

17. The system of claim 15, wherein the localized partial prefix sum of the update amounts is to be up to a SIMD execution engine length.

18. The system of claim 15, wherein the compiler comprises a just-in-time compiler.

19. The system of claim 15, further comprising a graphics processor to execute the translated application.

20. The system of claim 15, wherein the translation unit is located in a graphics driver.

* * * * *

UNITED STATES PATENT AND TRADEMARK OFFICE
CERTIFICATE OF CORRECTION

PATENT NO. : 9,449,360 B2
APPLICATION NO. : 13/997056
DATED : September 20, 2016
INVENTOR(S) : Janczak et al.

It is certified that error appears in the above-identified patent and that said Letters Patent is hereby corrected as shown below:

In the Claims

At Column 11, Claim number 1, Line number 27, after "and", insert --¶--

At Column 12, Claim number 15, Line number 43, delete "refix" and insert --prefix--

At Column 12, Claim number 15, Line number 43, delete "u s date" and insert --update--

At Column 12, Claim number 15, Line number 44, delete "re s lacement" and insert --replacement--

Signed and Sealed this
Nineteenth Day of June, 2018

Andrei Iancu
*Director of the United States Patent and Trademark Office*